US011468686B2

(12) United States Patent
Lee et al.

(10) Patent No.: US 11,468,686 B2
(45) Date of Patent: Oct. 11, 2022

(54) OMNIDIRECTIONAL OBSTACLE AVOIDANCE METHOD FOR VEHICLES

(71) Applicant: METAL INDUSTRIES RESEARCH & DEVELOPMENT CENTRE, Kaohsiung (TW)

(72) Inventors: Tsung-Han Lee, Kaohsiung (TW); Hung-Yuan Wei, Kaohsiung (TW); Jinn-Feng Jiang, Kaohsiung (TW); Shih-Chun Hsu, Kaohsiung (TW); Tsu-Kun Chang, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 421 days.

(21) Appl. No.: 16/662,342

(22) Filed: Oct. 24, 2019

(65) Prior Publication Data

US 2020/0175288 A1 Jun. 4, 2020

(30) Foreign Application Priority Data

Nov. 29, 2018 (TW) ................. 107142647

(51) Int. Cl.
   *G08G 1/16* (2006.01)
   *G06V 20/58* (2022.01)
   (Continued)

(52) U.S. Cl.
   CPC ............. *G06V 20/58* (2022.01); *B60Q 9/008* (2013.01); *B60W 50/14* (2013.01); *G08G 1/16* (2013.01); *B60W 2420/42* (2013.01)

(58) Field of Classification Search
   USPC ........................... 340/435, 903, 937; 701/301
   See application file for complete search history.

(56) References Cited

U.S. PATENT DOCUMENTS

| 5,670,935 A * | 9/1997 | Schofield ............. B60S 1/0844 340/461 |
| 6,268,803 B1 * | 7/2001 | Gunderson ............. G01S 7/003 340/903 |

(Continued)

FOREIGN PATENT DOCUMENTS

| CN | 102143cn302 A | 8/2011 |
| CN | 102439644 A | 5/2012 |

(Continued)

OTHER PUBLICATIONS

Office Action dated Dec. 1, 2020 for corresponding JP patent application No. 2019-215138.

(Continued)

*Primary Examiner* — Brent Swarthout
(74) *Attorney, Agent, or Firm* — Rosenberg, Klein & Lee

(57) ABSTRACT

A method for avoiding obstacles surrounding a mobile vehicle is disclosed. The method discloses that it is more accurate to merge images after a depth information is obtained to construct an environment information. The mobile vehicle set an omnidirectional depth sensing module using a lot of depth sensors for capturing a depth information of an environment surrounding the mobile vehicle and identifying the obstacles on the road upon the depth information. Also, scanning the smooth degree of the road for identifying static obstacles and moved obstacles, Thereby, a control circuit controls the mobile vehicle to lower speed or circumvent the danger.

7 Claims, 7 Drawing Sheets

(51) Int. Cl.
*B60W 50/14* (2020.01)
*B60Q 9/00* (2006.01)

(56) References Cited

U.S. PATENT DOCUMENTS

| | | | | |
|---|---|---|---|---|
| 9,187,091 | B2* | 11/2015 | Mills | B60W 10/18 |
| 2011/0190972 | A1* | 8/2011 | Timmons | G08G 1/166 |
| | | | | 701/31.4 |
| 2012/0140061 | A1* | 6/2012 | Zeng | G01S 13/867 |
| | | | | 348/135 |
| 2016/0021312 | A1 | 1/2016 | Kim et al. | |
| 2017/0280063 | A1 | 9/2017 | Jeon et al. | |
| 2017/0313247 | A1 | 11/2017 | Hsu et al. | |
| 2021/0146929 | A1* | 5/2021 | Clarke | G01C 21/10 |

FOREIGN PATENT DOCUMENTS

| | | |
|---|---|---|
| CN | 104956404 A | 9/2015 |
| CN | 105711492 A | 6/2016 |
| CN | 107944390 A | 4/2018 |
| CN | 108881717 A | 11/2018 |
| JP | 2007-304841 A | 11/2007 |
| JP | 2010-228740 A | 10/2010 |
| JP | 2016-142647 A | 8/2016 |
| JP | 2017-83232 A | 5/2017 |

OTHER PUBLICATIONS

Office Action for corresponding Chinese Patent Application 201910985251.2, dated Jan. 27, 2021.
International Office Action dated Dec. 16, 2021, for corresponding Patent Application No. 10201910618V.

* cited by examiner

OMNIDIRECTIONAL OBSTACLE AVOIDANCE METHOD FOR VEHICLES

FIELD OF THE INVENTION

The present invention relates generally to an obstacle avoidance method, and particular to an omnidirectional obstacle avoidance method for vehicles.

BACKGROUND OF THE INVENTION

Currently, it has been a pretty mature technology to install image capture devices on a vehicle, for example, a 3D automobile panorama image system using distance parameter to calibrate image correctness, which installs capture units, sensing units, and a processing unit on a vehicle. The capture units are used for capturing and transmitting omnidirectional aerial images surrounding an automobile. The sensing units are used for sensing the distances between the automobile and surrounding objects for generating and transmitting a plurality of distance signals. The processing unit includes a calibration module, a stitch module, and an operational module. The processing module receives the aerial images transmitted by the capture units and the distance signals transmitted by the sensing units. The calibration module calibrates the coordinate system of the aerial images according to the distance signals. Then the operational unit uses algorithms as well as insertion and patch techniques to give 3D automobile panorama images. The capture units are used for capturing and transmitting a plurality of omnidirectional aerial images surrounding the automobile. The sensing units are used for sensing the distance between the automobile and one or more object surrounding the automobile, and generating and transmitting a plurality of distance signals. Nonetheless, since ultrasonic sensors cannot get complete distance information unless the distance is closer and the sensing accuracy is low, they are not applicable to obstacle detection for moving automobiles.

To improve the sensing accuracy, according to the prior art, there is a camera lens set formed by multiple camera lenses. The camera lenses are disposed at different locations surrounding an automobile for taking and outputting multiple external images. The three-dimensional image processing module used for receiving images synthesize to give three-dimensional images using panorama projection images, captures partial three-dimensional panorama projection images according to the driver's field of vision corresponding to the driver's viewing angle, and outputs partial three-dimensional external images. Unfortunately, the images of the other angles during movement cannot be observed concurrently. Besides, the distance information of the obstacles surrounding a vehicle cannot be acquired real-timely.

Thereafter, although improvements are made in detecting the obstacles surrounding a vehicle for monitoring, there are still more objects might influence the movement of a vehicle in addition to other vehicles. For example, pedestrians, animals, and moving objects can be regarded as obstacles for a vehicle. They might cause emergent conditions for a moving vehicle. This influence is most serious in crowded streets of a city.

To solve the above problem, the present invention provides an omnidirectional obstacle avoidance method for vehicles. By acquiring omnidirectional images and omnidirectional depth information, the obstacle information surrounding a vehicle can be given. Then the vehicle is controlled to avoid the obstacles with higher risks and thus achieving the purpose of omnidirectional obstacle avoidance.

SUMMARY

An objective of the present invention is to provide an omnidirectional obstacle avoidance method for vehicles, which provides a fused omnidirectional image along with depth information for detecting omnidirectional obstacles and alarming for avoidance.

Another objective of the present invention is to provide an omnidirectional obstacle avoidance method for vehicles, which provides an alarm for omnidirectional obstacle avoidance and further controls a vehicle to avoid obstacles.

The present invention discloses an omnidirectional obstacle avoidance method for vehicles, which comprises steps of: capturing a plurality of peripheral images using a plurality of depth camera units of a vehicle and acquiring a plurality pieces of peripheral depth information according to a sensing algorithm; fusing the plurality of peripheral images to a plurality of omnidirectional environment images according to a fusion algorithm and dividing one side of the vehicle into a plurality of detection regions; operating the plurality pieces of peripheral depth information and the plurality of omnidirectional environment images according to the plurality of detection regions to give acceleration vector information and distance information of one or more obstacle; estimating a moving path of the one or more obstacle according to the acceleration vector information and the distance information of the one or more obstacle; and producing alarm information according to the moving path of the one or more obstacle. Thereby, the present invention can provide avoidance alarms for obstacles in the omnidirectional environment for a vehicle, so that the driver of the vehicle can prevent danger caused by obstacles in the environment.

According to an embodiment of the present invention, in the step of using a plurality of depth camera units of a vehicle and acquiring a plurality pieces of peripheral depth information according to a sensing algorithm, the plurality pieces of peripheral three-dimensional depth information are given according to the sensing result of the plurality of depth camera units and the sensing algorithm.

According to an embodiment of the present invention, in the step of fusing the plurality of peripheral images to a plurality of omnidirectional environment images, eliminate a plurality of overlap regions of the plurality of peripheral images according to a fusion algorithm and fuse to the plurality of omnidirectional environment images.

According to an embodiment of the present invention, the fusion algorithm further detects the edges of the plurality of peripheral images according to a plurality of detection ranges of the image capture module for giving and eliminating the plurality of overlap regions.

According to an embodiment of the present invention, in the step of estimating a moving path of the one or more obstacle according to the acceleration vector information and the distance information of the one or more obstacle, further estimate a moving speed and a moving distance of the one or more obstacle.

According to an embodiment of the present invention, in the step of estimating a moving path of the one or more obstacle according to the acceleration vector information and the distance information of the one or more obstacle, calculate to give a plurality of optical flow vectors using the image difference method, and estimate the acceleration vector information, the distance information, the moving speed, and the moving distance of the one or more obstacle according to the plurality of optical flow vectors.

According to an embodiment of the present invention, in the step of producing alarm information according to the moving path of the one or more obstacle, further control the vehicle to avoid the one or more obstacle.

According to an embodiment of the present invention, before the step of producing alarm information according to the moving path of the one or more obstacle, further classifying the one or more obstacle and labeling the one or more obstacle.

According to an embodiment of the present invention, the alarm information includes obstacle alarm information and avoidance information.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
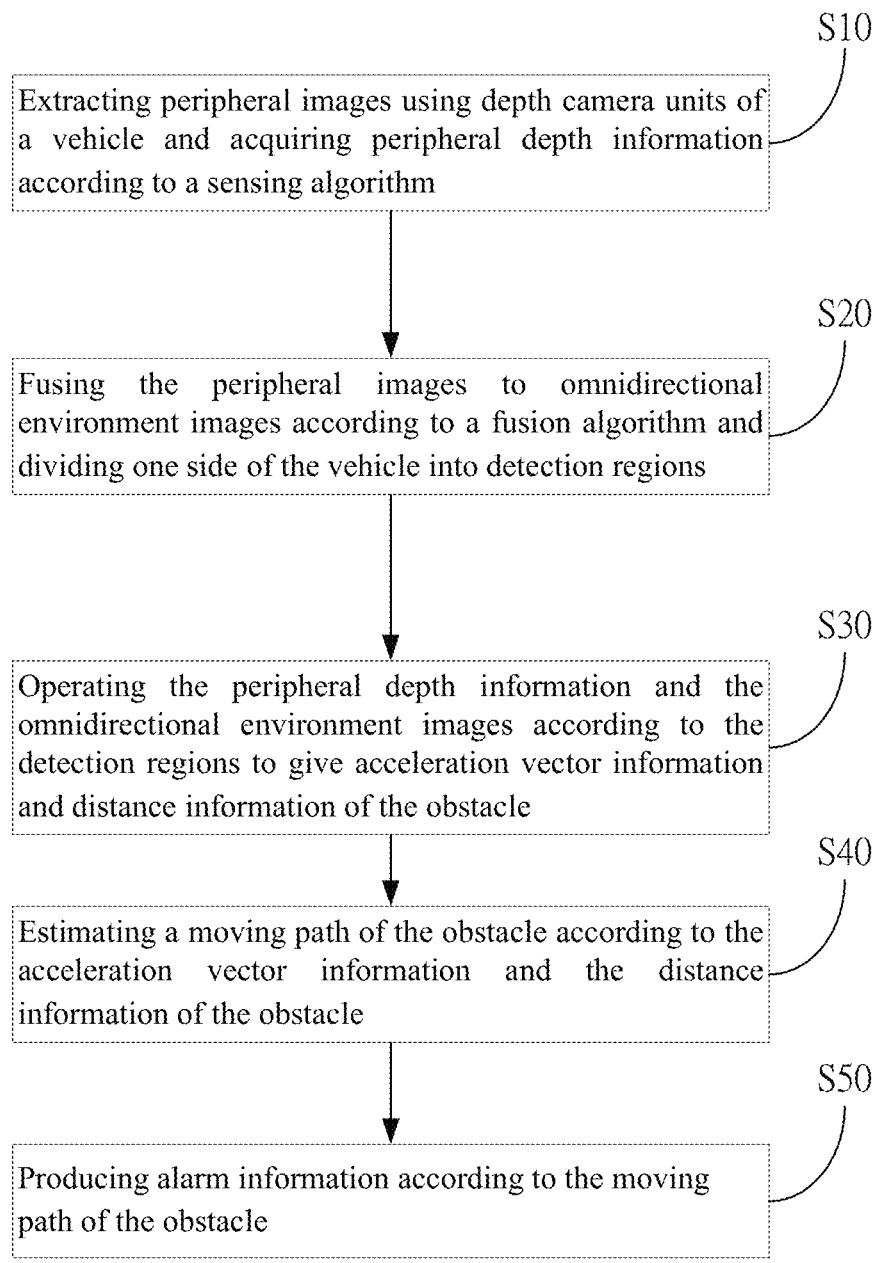
FIG. 1 shows a flowchart according to an embodiment of the present invention.

Please refer to FIG. 1, which shows a flowchart according to an embodiment of the present invention. As shown in the figure, the omnidirectional obstacle avoidance method according to the present invention comprises steps of:

Step S10: Capturing peripheral images using depth camera units of a vehicle and acquiring peripheral depth information according to a sensing algorithm;

Step S20: Fusing the peripheral images to omnidirectional environment images according to a fusion algorithm and dividing one side of the vehicle into detection regions;

Step S30: Operating the peripheral depth information and the omnidirectional environment images according to the detection regions to give acceleration vector information and distance information of the obstacle;

Step S40: Estimating a moving path of the obstacle according to the acceleration vector information and the distance information of the obstacle; and Step S50: Producing alarm information according to the moving path of the obstacle.

Figure 2A:
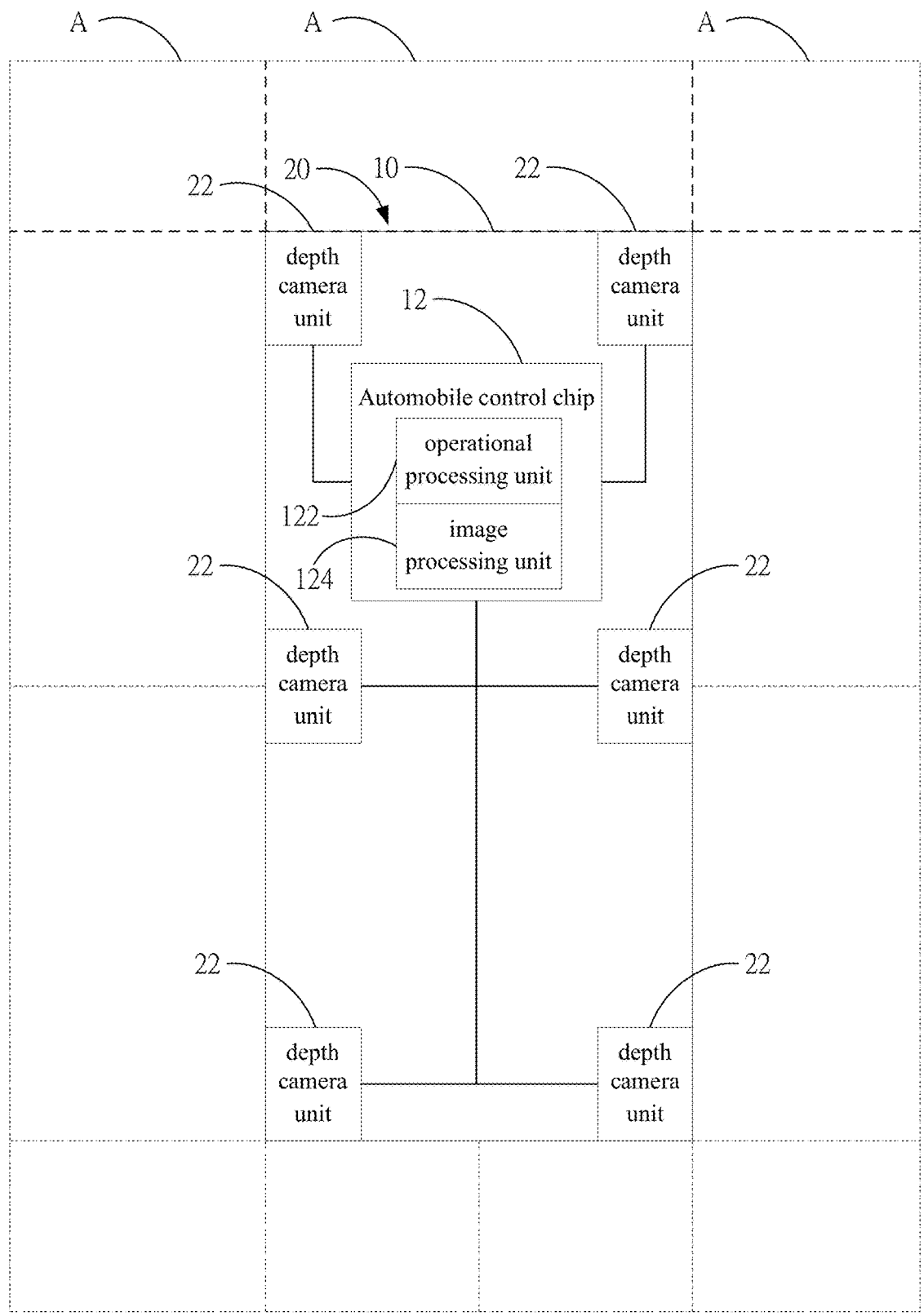
FIG. 2A shows a schematic diagram of the depth sensing module according to an embodiment of the present invention.
Figure 2B:
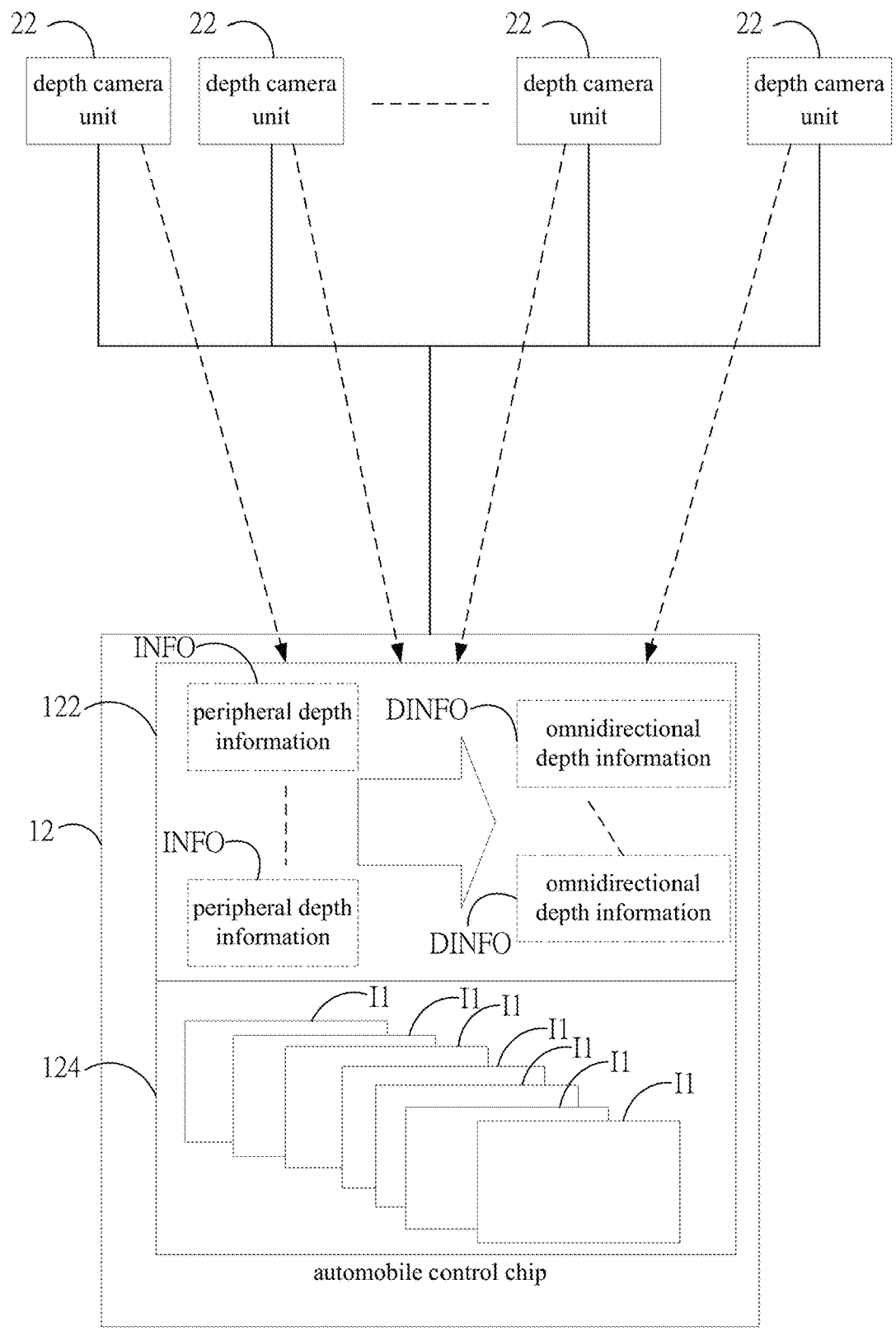
FIG. 2B shows a schematic diagram of integrating depth information according to an embodiment of the present invention.

In the step S10, as shown in FIG. 2A, a vehicle 10 taking peripheral images using a plurality of depth camera units 22 in a depth sensing module 20. By using the operational processing unit 122 of the automobile control chip 12, a plurality pieces of peripheral depth information INFO are acquired, as shown in FIG. 2B. By using the image processing unit 124 of the automobile control chip 12, a plurality of peripheral images I1 are acquired, as shown in FIG. 2B. According to the present embodiment, the plurality of depth camera units 22 are located on the periphery of the vehicle 10, respectively, for capturing the plurality of peripheral images surrounding the vehicle 100 at a time. In addition, according to the present embodiment, the depth sensing module 20 includes a plurality of high-resolution depth camera units 22 for acquiring depth images within the radius of 15 meters. The plurality of depth camera units 22 acquires the plurality pieces of peripheral depth information Info.

The automobile control chip 12 is connected with the plurality of depth camera units 22 and forming the depth sensing module 20 for acquiring omnidirectional depth images. After the operations and processing of the operational processing unit 122 and the image processing unit 124, the plurality of peripheral depth information Info1 and the plurality of peripheral images I1 are given. The plurality of depth camera units 22 can further sense using infrared or ultrasonic methods. In addition, as shown in FIG. 2B, according to the present embodiment, the sensing result of the plurality of depth camera units 22 is operated by the operational processing unit 122 according to a sensing algorithm for producing the plurality pieces of peripheral depth information INFO, which is integrated by the operational processing unit 122 to form a plurality pieces of omnidirectional depth information DINFO.

The sensing algorithm executed by the operational processing unit 122 is described as follows:

Sobel Edge Detection

Each pixel in an image and its neighboring pixels are represented by a 3×3 matrix and expressed by P1, P2, P3, P4 . . . , P9 in Equation 1:

$$\nabla f = |Gx| + |Gy| \qquad \text{Equation 1}$$

$$\begin{bmatrix} P1 & P2 & P3 \\ P4 & P5 & P6 \\ P7 & P8 & P9 \end{bmatrix}, \qquad \text{Equation 2}$$

$$Gx = \begin{bmatrix} P1 & P2 & P3 \\ P4 & P5 & P6 \\ P7 & P8 & P9 \end{bmatrix} \qquad \text{Equation 3}$$

$$Gy = \begin{bmatrix} P1 & P2 & P3 \\ P4 & P5 & P6 \\ P7 & P8 & P9 \end{bmatrix} \qquad \text{Equation 4}$$

$$\begin{bmatrix} f(x-1, y-1) & f(x, y-1) & f(x+1, y-1) \\ f(x-1, y) & f(x, y) & f(x+1, y) \\ f(x-1, y+1) & f(x, y+1) & f(x+1, y+1) \end{bmatrix} \qquad \text{Equation 5}$$

$$E(h, O) = D(O, h, C) + \lambda_k * Kc(h) \qquad \text{Equation 6}$$

$$D(O, h, C) = \qquad \text{Equation 7}$$

$$\frac{\sum_{min}(|o_d - r_d|, d_M)}{\sum(o_s \vee r_m) + \varepsilon} + \lambda\left(1 - \frac{2\sum(o_s \wedge r_m)}{\sum(o_s \wedge r_m) + \sum(o_s \vee r_m)}\right)$$

Images are formed according to the angle α between two depth sensors corresponding to the world coordinates. The world coordinates are defined as Ow−XwYwZw, where Xc=Xw, Yc=−Yw, Zc=L−Zw, and A is the image A'. Then:

$$\frac{X_w}{X} = -\frac{Y_w}{y} = \frac{L - Z_w}{f} \qquad \text{Equation 8}$$

Thereby, Equation 8 is rewritten according to the world coordinates. The previous plane equations are expressed in the world coordinates to deduce the sensing result for the peripheral environment, and giving:

$$Xw - Zw\tan\alpha \qquad \text{Equation 9}$$

$$Xw = \frac{Xl\tan\alpha}{X + f\tan\alpha} \qquad \text{Equation 10}$$

$$Yw = \frac{-Yl\tan\alpha}{X + f\tan\alpha} \qquad \text{Equation 11}$$

$$Zw = \frac{ZL}{X + f\tan\alpha} \qquad \text{Equation 12}$$

$$\begin{bmatrix} u \\ v \\ 1 \end{bmatrix} = \begin{bmatrix} \frac{1}{Sx} & 0 & u_0 \\ 0 & \frac{1}{Sy} & v_0 \\ 0 & 0 & 1 \end{bmatrix} = \begin{bmatrix} x \\ y \\ 1 \end{bmatrix} \qquad \text{Equation 13}$$

$$\begin{bmatrix} x \\ y \\ 1 \end{bmatrix} = \begin{bmatrix} Sx & 0 & -u_0 Sx \\ 0 & Sy & -v_0 Sy \\ 0 & 0 & 1 \end{bmatrix} = \begin{bmatrix} u \\ v \\ 1 \end{bmatrix} \qquad \text{Equation 14}$$

$$Xw = \frac{f_x(u - u_0)l - \tan\alpha}{f_x(u - u_0)l + \tan\alpha} \qquad \text{Equation 15}$$

$$Yw = \frac{-f_y(v - v_0)l - \tan\alpha}{f_x(u - u_0)l + \tan\alpha} \qquad \text{Equation 16}$$

$$Zw = \frac{f_x(u - u_0)l}{f_x(u - u_0)l + \tan\alpha} \qquad \text{Equation 17}$$

Figure 2C:
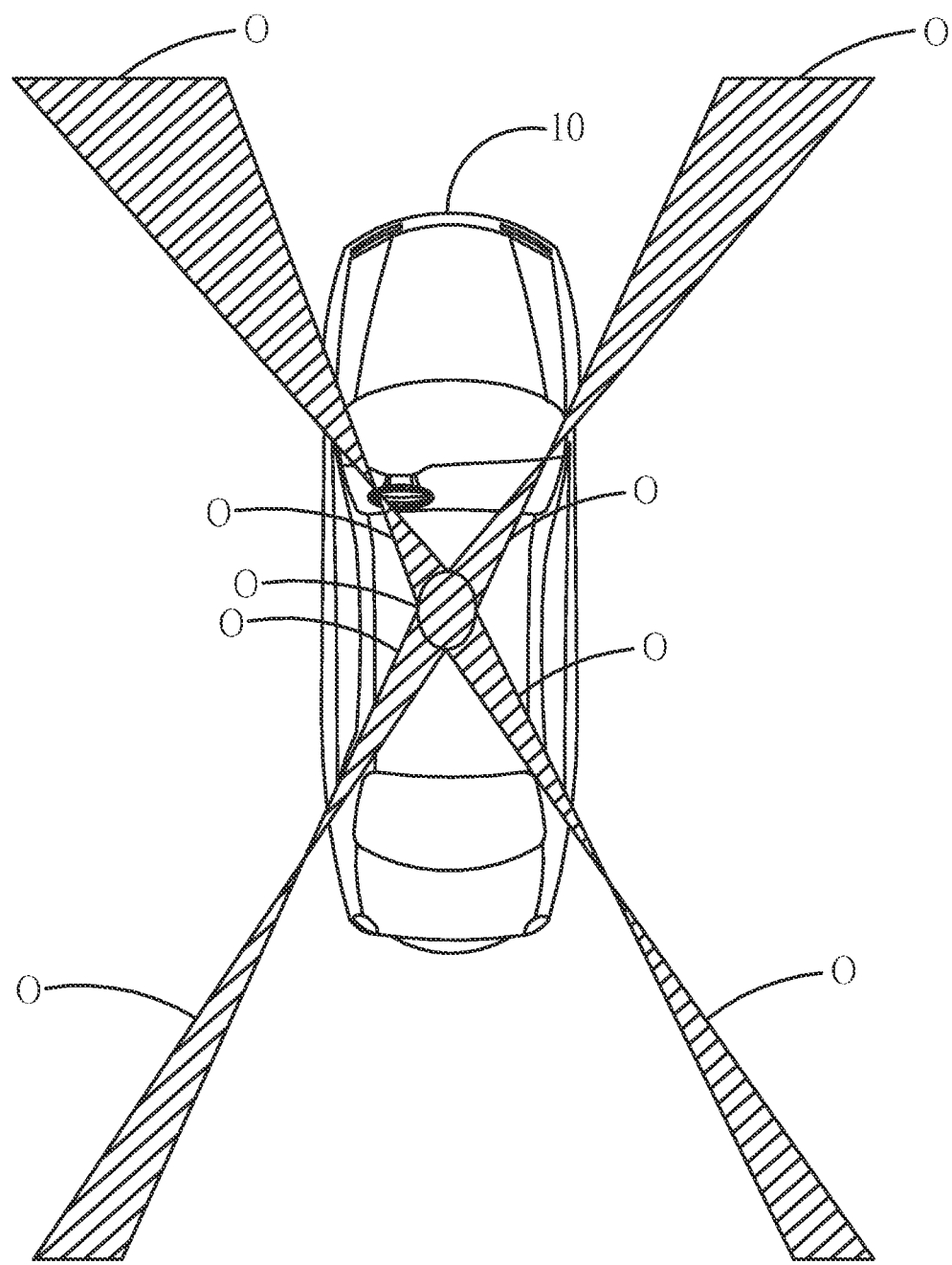
FIG. 2C shows a schematic diagram of the overlap regions according to an embodiment of the present invention.
Figure 2D:
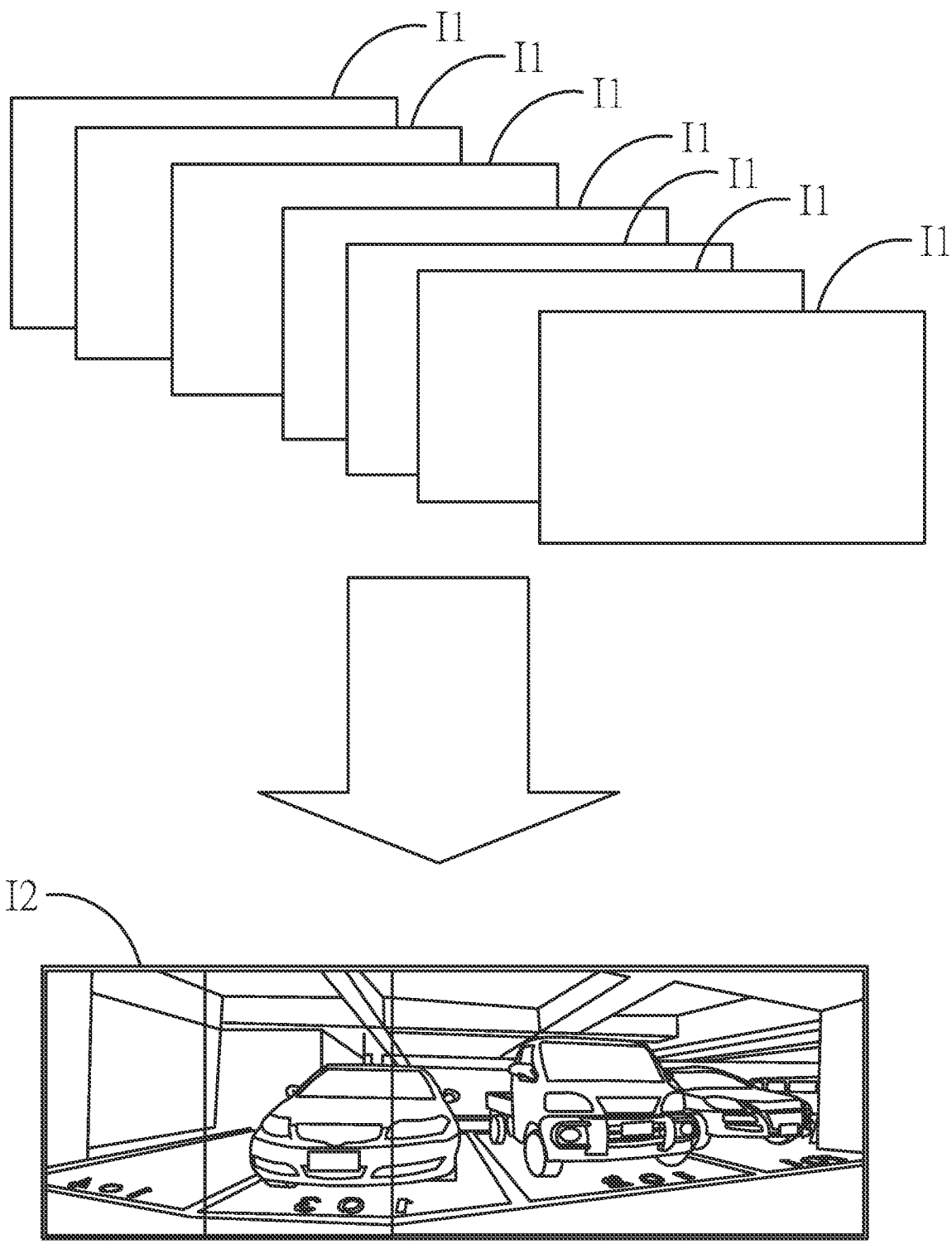
FIG. 2D shows a schematic diagram of image fusion according to an embodiment of the present invention.

In the step S20, as shown in FIG. 2D, fuse the plurality of peripheral images I1 to an omnidirectional environment image I2. According to the present embodiment, the fusion algorithm adopts characteristic functions f(x,y), f(x,y) shown in Equation 8. When x or y satisfies a certain fact, the characteristic function will be 1.

$$f_i(x,y) \in \{0,1\}, i=1,2,\ldots,m \qquad \text{Equation 18}$$

The corresponding hidden status of an observation value is determined by the context (observation, status). By using characteristic functions, the environment characteristics (the combination of observation or status) can be selected. Namely, characteristics (observation combination) is used to replace observation for avoiding the limitation imposed by the assumption of independent observation of naive Bayes in the hidden Markov model (HMM) model.

According to the training data D={(x$^{(1)}$, y$^{(1)}$, (x$^{(2)}$, y$^{(2)}$), . . . , (x$^{(N)}$, y$^{(N)}$)} with the size T, the empirical expectation value is expressed in Equation 19 and the model expectation value is expressed in Equation 20. The learning of the maximum entropy model is equivalent to constraint optimization.

$$\tilde{E}_p(f_i) = \frac{1}{n}\sum_{x,y} P(x,y)f_i(x,y) \qquad \text{Equation 19}$$

$$E_p(f_i) = \frac{1}{n}\sum_{x,y} P(x)p(y|x)f_i(x,y) \qquad \text{Equation 20}$$

Assuming the empirical expectation value is identical to the model expectation value, there are multiple sets C satisfying the constraint related to the conditional probability distribution of arbitrary characteristic function Fi, expressed as in Equation 21 below:

$$C = \{P|E_p(f_i) = \tilde{E}_p(f_i), i=1,2,\ldots,m\} \qquad \text{Equation 21}$$

According to the maximum entropy theory, to deduce the only reasonable probability distribution from incomplete information (such as limited training data), the entropy should be maximized given the constraints imposed by the information are satisfied. Namely, the distribution of maximum entropy is the optimized distribution given the probability set of limited conditions. Thereby, the maximum entropy model becomes a constraint optimization problem for convex functions.

$$\max_{P \in C} H(P) = -\sum_{x,y} P(x)P(y|x)\log P(y|x) \qquad \text{Equation 22}$$

$$\text{s.t. } E_p(f_i) = \tilde{E}_p(f_i), i = 1, 2, \ldots, m \qquad \text{Equation 23}$$

$$\text{s.t. } \sum_y P(y|x) = 1 \qquad \text{Equation 24}$$

The Lagrange duality is generally adopted to transform an equation to an unconstrained one for solving for extreme values:

$$L(\omega, \alpha, \beta) = f(\omega) + \sum_{i=1}^{k} \alpha_i g_i(\omega) + \sum_{j=1}^{k} \beta_j h_j(\omega) \qquad \text{Equation 25}$$

$$\Lambda(p, \tilde{\lambda}) = \qquad \text{Equation 26}$$

$$H(y|x) + \sum_{i=1}^{m} \lambda_i(E_p(f_i) - \tilde{E}_p(f_i)) + \lambda_{m+1}\left(\sum_{y \in Y} P(y|x) - 1\right)$$

Calculate the partial derivative of the Langrage function with respect to p and make it equal to 0. Solve the equation. By omitting several steps, the following equations are derived:

$$P^*_{\tilde{\lambda}}(y|x) = \frac{1}{Z_{\tilde{\lambda}}(x)} \exp\left(\sum_{i=1}^{m} \lambda_i f_i(x, y)\right) \qquad \text{Equation 27}$$

$$Z_{\tilde{\lambda}}(x) = \sum_{y \in Y} \exp\left(\sum_{\alpha}^{m} \lambda_i f_i(x, y)\right) \qquad \text{Equation 28}$$

Maximum Entropy Markov Model (MEMM)

$$P_{y_{i-1}}(y_i|x_i) = \frac{1}{Z_{\tilde{\lambda}}(x_i, y_{i-1})} \exp\left(\sum_{\alpha}^{m} \lambda_\alpha f_\alpha(x_i, y_i)\right), \qquad \text{Equation 29}$$

$$i = 1, 2, \ldots, T$$

Use P(y$_i$|y$_{i-1}$, x$_i$) distribution to replace the two conditional probability distribution in the HMM. It means to calculate the probability of the current state according to the previous state and the current observation. Each of such distribution function p$_{y_{i-1}}$(y$_i$|x$_i$) is an index model complying with maximum entropy.

If the points {p$_1$, p$_2$, . . . , p$_n$} in discrete probability distribution and the maximum information entropy have been found and the probability distribution to be found is {p$_1$, p$_2$, . . . , p$_n$}, the maximum entropy equation is:

$$f(p_1, p_2, \ldots p_n) = -\Sigma_{j=1}^n P_j \log_2 P_j \qquad \text{Equation 30}$$

The sum of the probability distribution $P_i$ at each point $x_i$ must be 1:

$$g(p_1, p_2, \ldots, p_n) = \sum_{j=1}^{n} p_j = 1 \quad \text{Equation 31}$$

By using the Lagrange multiplier, the angle of the maximum entropy can be deduced; $\vec{p}$ covers all the $\{x_1, x_2, \ldots, x_n\}$ in the discrete probability distribution of $\vec{p}$:

$$\frac{\partial}{\partial \vec{p}} \{f + \lambda(g-1)\} \Big|_{\vec{p}=\vec{p}^*} = 0 \quad \text{Equation 32}$$

A system of Ñ equations, where k=1, ... n, is given, to make:

$$\frac{\partial}{\partial p_k}\left\{-\left(\sum_{j=1}^{n} p_j \cdot \log_2 p_j\right) + \lambda\left(\sum_{j=1}^{n} p_j - 1\right)\right\}\Big|_{p_k = p_k^*} = 0 \quad \text{Equation 33}$$

By extending these Ñ equations, it gives:

$$-\left(\frac{1}{\ln 2} + \log_2 p_k^*\right) + \lambda = 0 \quad \text{Equation 34}$$

It means that all $p^*_k$ are equal, since they depend on $\lambda$ only. By using the following constraint:

$$\sum_j p_j = 1 \times p_k^* = \frac{1}{n} \quad \text{Equation 35}$$

it gives $$p_k^* = \frac{1}{n} \quad \text{Equation 36}$$

Thereby, the uniform distribution is the distribution for maximum entropy.

$$\text{Maxmium entropy distribution} = H = \left|\frac{\sum_{j=1}^{n} P_j - P_k}{\sum_{j=1}^{n} P_j}\right| \times 100 \quad \text{Equation 37}$$

By using Equation 37, the maximum entropy distribution can be deduced. As shown in FIG. 2C, during the process of image fusion, the image overlap regions O are eliminated and an omnidirectional environment image I2 is produced, as shown in FIG. 2D. In other words, by using the maximum entropy distribution given by Equation 37, all peripheral images I1 are fused, the overlap regions O are eliminated, and the omnidirectional environment image I2 is produced.

Besides, as shown in FIG. 2A and FIG. 2B, in the step S20, divide the peripheral region of the vehicle 10 into a plurality of detection regions A according to the plurality of omnidirectional environment images I2 and the plurality pieces of omnidirectional depth information DINFO.

In the step S30, referring to FIG. 2A and FIG. 2B, by using the plurality of detection regions A and the Lucas-Kanade optical flow algorithm, the obstacle is estimated. First, by using the image difference method, apply the Taylor equation to the image constraint equation to give:

$$I(x + \delta x, y + \delta y, z + \delta z, t + \delta t) = \quad \text{Equation 38}$$
$$I(x, y, z, t) + \frac{\partial I}{\partial x}\delta x + \frac{\partial I}{\partial y}\delta y + \frac{\partial I}{\partial z}\delta z + \frac{\partial I}{\partial t}\delta t + H.O.T$$

The H.O.T. represent the higher order terms, which can be ignored when the movement is small enough. According to the equation, it can be obtained as follow:

$$\frac{\partial I}{\partial x}\delta x + \frac{\partial I}{\partial y}\delta y + \frac{\partial I}{\partial z}\delta z + \frac{\partial I}{\partial t}\delta t = 0 \text{ or} \quad \text{Equation 39}$$

$$\frac{\partial I}{\partial x}\frac{\delta x}{\delta t} + \frac{\partial I}{\partial y}\frac{\delta y}{\delta t} + \frac{\partial I}{\partial z}\frac{\delta z}{\delta t} + \frac{\partial I}{\partial t}\frac{\delta t}{\delta t} = 0 \quad \text{Equation 40}$$

giving:

$$\frac{\partial I}{\partial x}V_X + \frac{\partial I}{\partial y}V_X + \frac{\partial I}{\partial z}V_X + \frac{\partial I}{\partial t} = 0 \quad \text{Equation 41}$$

$V_x$, $V_y$, and $V_z$ are the optical flow vector components of $I(x,y,z,t)$ in x, y, and z directions, respectively.

$$\frac{\partial I}{\partial x}, \frac{\partial I}{\partial y}, \frac{\partial I}{\partial z} \text{ and } \frac{\partial I}{\partial t}$$

are the differences in the corresponding directions for a point (x,y,z,t) in an image. Thereby, Equation 42 can be converted to the following equation:

$$I_x V_X + I_y V_y + I_z V_Z = -I_t \quad \text{Equation 42}$$

Equation 42 can be further rewritten as:

$$\nabla I^T \cdot \vec{V} = -I_t \quad \text{Equation 43}$$

Since there are three unknowns (Vx,Vy,Vz) in Equation 41, the subsequent algorithm is used to deduce the unknowns.

First, assume the optical flow $(V_x, V_y, V_z)$ is constant in a small window of m*m*m (m>1). Then, according to the primitives 1 to n, n=m$^3$, the following ser of equations is given:

$$\begin{aligned} I_{x1}V_X + I_{y1}V_y + I_{z1}V_Z &= -I_{T1} \\ I_{x2}V_X + I_{y2}V_y + I_{z2}V_Z &= -I_{T2} \\ &\vdots \\ I_{xn}V_X + I_{yn}V_y + I_{zn}V_Z &= -I_{Tn} \end{aligned} \quad \text{Equation 44}$$

The above multiple equations all include three unknowns and forming an equation set. The equation set is an over-determined equation set, and can be expressed as:

$$\begin{bmatrix} I_{x1} & I_{y1} & I_{z1} \\ I_{x2} & I_{y1} & I_{z1} \\ \vdots & \vdots & \vdots \\ I_{xn} & I_{yn} & I_{zn} \end{bmatrix} \begin{bmatrix} V_x \\ V_y \\ V_z \end{bmatrix} = \begin{bmatrix} -I_{t1} \\ -I_{t2} \\ \vdots \\ -I_{tm} \end{bmatrix} \quad \text{Equation 45}$$

which is denoted as $$A\vec{v} = -b \quad \text{Equation 46}$$

To solve this overdetermined problem, Equation 46 is deduced using the least squares method:

$$A^T A \vec{v} = A^T(-b) \quad \text{Equation 47}$$

Or $$\vec{v} = (A^T A)^{-1} A^T(-b) \quad \text{Equation 48}$$

giving $$\begin{bmatrix} V_x \\ V_y \\ V_z \end{bmatrix} = \begin{bmatrix} \sum I_{xi}^2 & \sum I_{xi}I_{yi} & \sum I_{xi}I_{zi} \\ \sum I_{xi}I_{yi} & \sum I_{yi}^2 & \sum I_{yi}I_{zi} \\ \sum I_{xi}I_{zi} & \sum I_{yi}I_{zi} & I_{zi}^2 \end{bmatrix}^{-1} \begin{bmatrix} -\sum I_{xi}I_{ti} \\ -\sum I_{yi}I_{ti} \\ -\sum I_{zi}I_{ti} \end{bmatrix} \quad \text{Equation 49}$$

Substitute the result of Equation 49 into Equation 41 for estimating acceleration vector information and distance information of the one or more obstacle.

Figure 2E:
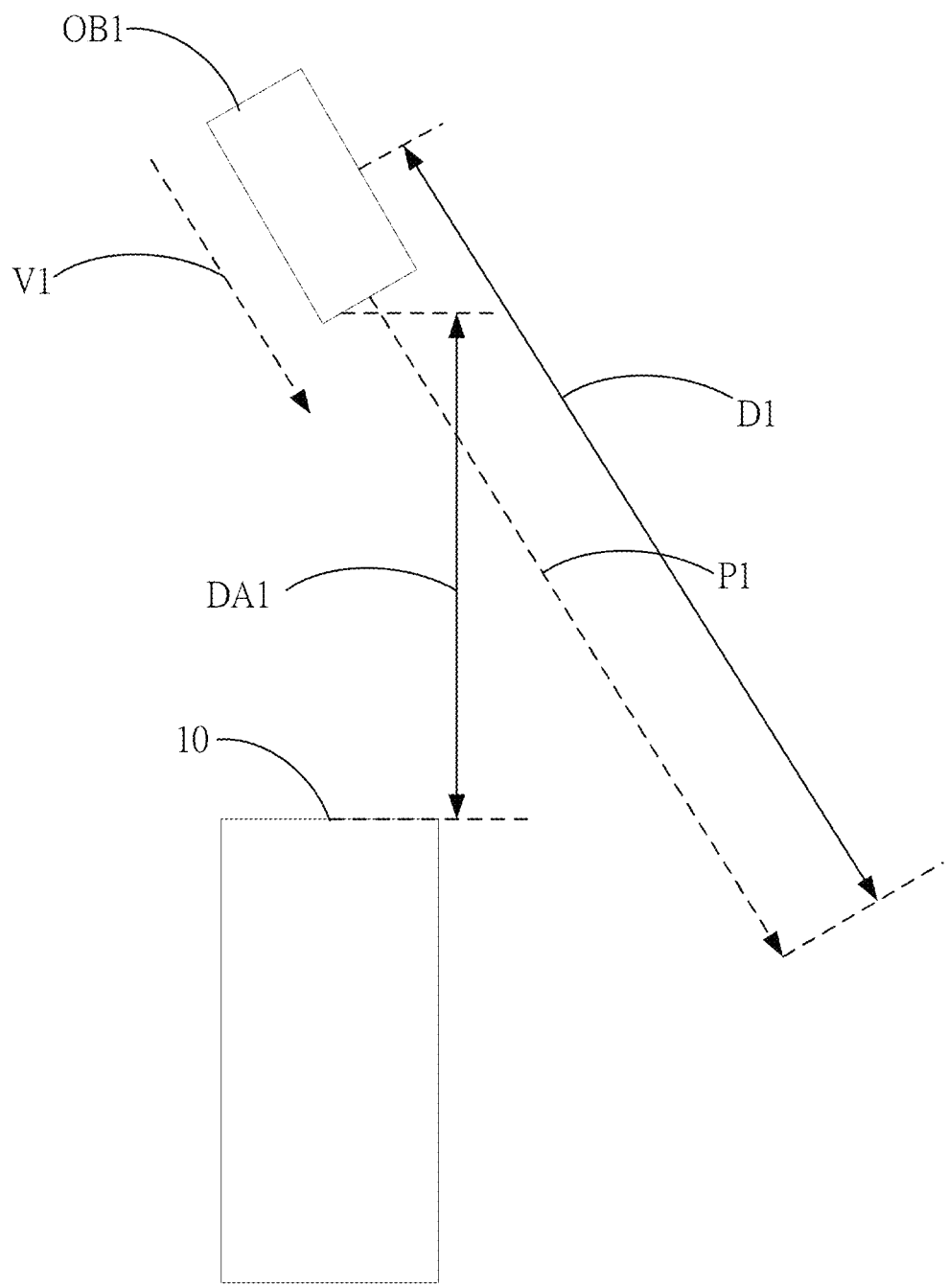
FIG. 2E shows a schematic diagram of detecting obstacle according to an embodiment of the present invention.

In the step S40, as shown in FIG. 2E, by using the acceleration vector information and the distance information given by the previous step S30, the moving direction of the one or more obstacle surrounding the vehicle 10 can be deduced and thus estimating a moving path P1 of the one or more obstacle OB. Besides, the vehicle 10 according to the present embodiment can further use the operational processing unit 122 in the automobile control chip 12 to further estimate a moving speed V1 and a moving distance D1 of a first obstacle OB1. The first obstacle OB1 according to the present embodiment will pass in front of the vehicle 10, and the vehicle 10 will pass across the moving path P1 of the first obstacle OB1.

In the step S50, the automobile control chip 12 in the vehicle 10 generates alarm information according the moving path of the one or more obstacle. According to the present embodiment, the automobile control chip 12 judges that a first alarm distance DA1 between the vehicle 10 and the first obstacle OB1 reaches within a first threshold value and transmits the alarm information for general obstacle. For example, the alarm information is displayed on a head-up display (HUD). When the first alarm distance DA1 enters a second threshold value, the automobile control chip 12 outputs a single alarm sound and controls the HUD to display the alarm information. When the first alarm distance DA1 enters a third threshold value, the automobile control chip 12 outputs intermittent alarm sound and controls the HUD (not shown in the figure) to display the alarm information. When the first alarm distance DA1 enters a fourth threshold value, the automobile control chip 12 outputs continuous alarm sound and controls the HUD (not shown in the figure) to display the alarm information. Since the fourth threshold value means that the obstacle OB is quite close to the vehicle 10, the automobile control chip 12 uses an urgent method to express the alarm information.

Figure 2F:
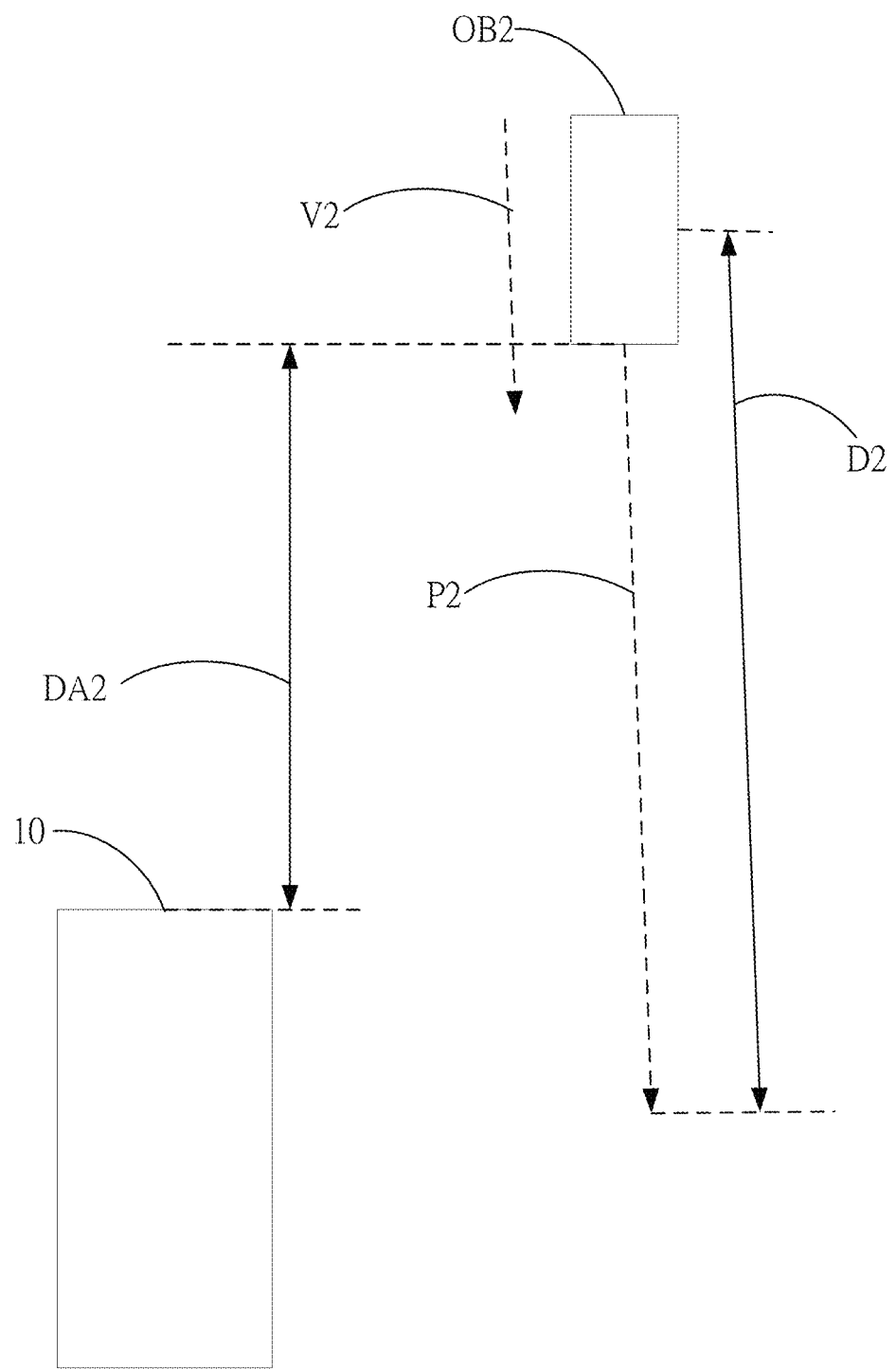
FIG. 2F shows a schematic diagram of detecting obstacle according to another embodiment of the present invention.

As shown in FIG. 2F, another embodiment of the present invention is illustrated. By using the omnidirectional obstacle avoidance method for vehicles according to the present invention, a second obstacle OB2 is detected and the moving path P2 of the second obstacle OB2 is estimated. The automobile control chip 12 judges that the vehicle will not pass across the moving path P2 of the second obstacle OB2. In addition, after judgement, the moving distance D2 and the moving speed V2 of the second obstacle OB2 do not change. Thereby, when the distance between the vehicle 10 and the second obstacle OB2 is a second alarm distance DA2 and the second alarm distance DA1 is within the first, or even the fourth threshold value, the automobile control chip 12 only controls the HUD to display the alarm information. The HUD described above is a mature technology for vehicles. Since the emphasis of the present invention is not on the HUD, it is used for illustrating display method. According to the present invention, the alarm information can be further displayed on the display on the dashboard of the vehicle 10, such as a car audio and video display.

Besides, according to the present invention, before the step S50, the automobile control chip 12 can classify and label obstacles. For example, classify the first obstacle OB1 as a dangerous obstacle and the second obstacle OB2 as a non-dangerous one. They are labeled in the omnidirectional environment image 12, displayed on the HUD, or displayed on the car audio and video display.

To sum up, the present invention provides an omnidirectional obstacle avoidance method for vehicles to achieve preventive avoidance. According to the distance, location, speed, acceleration of obstacles provided by the sensors, multiple types of information such as moving direction can be estimated. According to the information, driving risks can be evaluated and provided to drivers for reference. In addition, the obstacle information for vehicles encountering danger during the moving process is provided as reference data and acts as important data for prevention and judgement. Thereby, the vehicles can avoid high risk behaviors in advance, reduce risks effectively, and achieve the following effects:

1. The omnidirectional avoidance technology can be applied to various environments, such as reversing a car with a reversing radar. In addition to acquiring more detailed distance information and a broader identification range, the moving direction of the vehicles can be alarmed in advance for preventing accidents. Thereby, better alarm efficacy can be achieved.

2. Side blind spots reminder can provide alarms before the driver opens the door and gets off the car for reminding the driver to watch out for pedestrians. The present invention can be applied to turning and lane change. Compared to current methods, the present invention can provide more driving information beneficial to the driver's judgement. Currently, car accidents are mostly caused by driver's distraction. The present invention can prevent driving risks caused by distracted driving.

Accordingly, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. An omnidirectional obstacle avoidance method for vehicles, comprising steps of:
   capturing a plurality of peripheral images using a plurality of depth camera units of a vehicle and acquiring a plurality pieces of peripheral depth information according to a sensing algorithm, said plurality of peripheral images including one or more obstacle, and said one or more obstacle located on one side of said vehicle;

fusing said plurality of peripheral images to a plurality of omnidirectional environment images according to a fusion algorithm and dividing said side of said vehicle into a plurality of detection regions;

operating said plurality pieces of peripheral depth information and said plurality of omnidirectional environment images according to said plurality of detection regions to give acceleration vector information and distance information;

estimating a moving path of said one or more obstacle according to said acceleration vector information and said distance information of said one or more obstacle; and producing alarm information according to said moving path of said one or more obstacle;

wherein said step of fusing said plurality of peripheral images to a plurality of omnidirectional environment images according to a fusion algorithm and dividing said side of said vehicle into a plurality of detection regions, comprises eliminating a plurality of overlap regions of said plurality of peripheral images according said fusion algorithm and fuse to said omnidirectional environment images.

2. The method of claim 1, wherein in said step of capturing a plurality of peripheral images using a plurality of depth camera units of a vehicle and acquiring a plurality pieces of peripheral depth information according to a sensing algorithm, said plurality pieces of peripheral depth information is deduced according to the sensing result of said plurality of depth camera units and said sensing algorithm.

3. The method of claim 1, wherein said step of operating said plurality pieces of peripheral depth information and said plurality of omnidirectional environment images according to said plurality of detection regions, comprises using an image difference method to calculate according to said plurality pieces of peripheral depth information and said plurality of omnidirectional environment images for giving a plurality of optical flow vectors, and further giving said acceleration vector information and said distance information according to said plurality of optical flow vectors.

4. The method of claim 1, wherein said step of estimating a moving path of said one or more obstacle according to said acceleration vector information and said distance information of said one or more obstacle, further comprises estimating a moving speed and a moving distance of said one or more obstacle.

5. The method of claim 1, wherein said step of producing alarm information according to said moving path of said one or more obstacle, further comprises controlling said vehicle to avoid said one or more obstacle.

6. The method of claim 1, wherein before said step of producing alarm information according to said moving path of said one or more obstacle, further comprises classifying and labelling said one or more obstacle.

7. The method of claim 1, wherein said alarm information includes obstacle alarm information and avoidance information.

* * * * *